United States Patent
Tran et al.

(10) Patent No.: US 9,938,436 B2
(45) Date of Patent: Apr. 10, 2018

(54) UV RESISTANT EPOXY STRUCTURAL ADHESIVE

(71) Applicant: Huntsman Advanced Materials Americas LLC, The Woodlands, TX (US)

(72) Inventors: Frank Tran, The Woodlands, TX (US); Derek S. Kincaid, Spring, TX (US); K. P. Subrahmanian, The Woodlands, TX (US); Surendar N. Kaul, League City, TX (US)

(73) Assignee: HUNTSMAN ADVANCED MATERIALS AMERICAS LLC, The Woodlands, TX (US)

( * ) Notice: Subject to any disclaimer, the term of this patent is extended or adjusted under 35 U.S.C. 154(b) by 0 days.

(21) Appl. No.: 14/425,060

(22) PCT Filed: Aug. 13, 2013

(86) PCT No.: PCT/US2013/054698
§ 371 (c)(1),
(2) Date: Mar. 2, 2015

(87) PCT Pub. No.: WO2014/058527
PCT Pub. Date: Apr. 17, 2014

(65) Prior Publication Data
US 2015/0232717 A1   Aug. 20, 2015

Related U.S. Application Data

(60) Provisional application No. 61/711,777, filed on Oct. 10, 2012.

(51) Int. Cl.
*C09J 163/00* (2006.01)
*C09J 5/00* (2006.01)

(52) U.S. Cl.
CPC ............... *C09J 163/00* (2013.01); *C09J 5/00* (2013.01); *C09J 2463/00* (2013.01)

(58) Field of Classification Search
None
See application file for complete search history.

(56) References Cited

U.S. PATENT DOCUMENTS

| | | | |
|---|---|---|---|
| 3,336,241 A | 8/1967 | Sbokal | |
| 4,397,998 A * | 8/1983 | De La Mare | C08F 283/10 523/456 |
| 5,313,998 A | 5/1994 | Colson et al. | |
| 6,417,316 B1 | 7/2002 | Wiesendanger et al. | |
| 6,869,497 B2 | 3/2005 | Doe et al. | |
| 7,348,385 B2 | 3/2008 | Wang et al. | |
| 7,479,528 B2 | 1/2009 | Wang et al. | |
| 2003/0116347 A1* | 6/2003 | Kubo | C08G 59/5033 174/260 |
| 2009/0286924 A1 | 11/2009 | Tsuchida | |
| 2010/0320635 A1 | 12/2010 | Ota et al. | |
| 2011/0120646 A1 | 5/2011 | Gorodisher et al. | |
| 2011/0126980 A1 | 6/2011 | Campbell et al. | |
| 2011/0143061 A1 | 6/2011 | Thiemann et al. | |
| 2011/0177242 A1 | 7/2011 | Kolowrot | |
| 2011/0196068 A1* | 8/2011 | Fung | C08G 59/24 523/435 |
| 2012/0029115 A1 | 2/2012 | Wu et al. | |
| 2015/0119500 A1* | 4/2015 | Song | C09D 5/08 523/427 |

FOREIGN PATENT DOCUMENTS

| | | |
|---|---|---|
| EP | 1 000 957 | 5/2000 |
| JP | 2007277573 A | 10/2007 |
| JP | 2009143939 A | 7/2009 |
| JP | 2010175220 A | 8/2010 |
| WO | 96009352 | 3/1996 |
| WO | 2010087489 A1 | 8/2010 |
| WO | 2011/075128 | 6/2011 |
| WO | 2012/087459 | 6/2012 |

OTHER PUBLICATIONS

Japanese office action issued in Patent Application No. 2015-536769 dated Sep. 12, 2017, and English translation thereof, 12 pages.
Google translation of Japanese Patent Application with serial No. 2009143939, publication date Jul. 2, 2009, 10 pages.

* cited by examiner

*Primary Examiner* — Ana L Woodward

(57) ABSTRACT

The present disclosure relates to UV resistant multi-component structural adhesive systems that are substantially free of aromatic epoxy resins, Also provided are methods of preparing the multi-component structural adhesive systems and methods of bonding substrates together with such adhesive systems.

17 Claims, No Drawings

UV RESISTANT EPOXY STRUCTURAL ADHESIVE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present disclosure is directed to multi-component structural adhesives which are capable of safely and sufficiently bonding substrates. More particularly, the present disclosure relates to two-part, structural adhesive systems that exhibit, upon rapid curing at ambient temperature, UV resistance, sag resistance and high shear performance.

BACKGROUND OF THE INVENTION

Structural adhesives are generally thermosetting resins that may be used to replace or augment conventional joining techniques such as screws, bolts, nails, staples, rivets, welding, brazing and soldering. These structural adhesives are generally supplied as two components that are mixed just prior to application. Some examples of known structural adhesives in the industry include, for example:

U.S. Pat. App. Publication No. 2012/0029115 which relates to a room temperature curable two-part epoxy structural adhesive composition containing (A) a bisphenol A epoxy resin, a CTBN modified bisphenol A type epoxy resin and/or a core-shell polymer toughened bisphenol A type epoxy resin, a silane coupling agent, a thixotropic agent and a coloring agent, and (B) a polyamide, a polyether amine, a filler and a curing accelerator;

U.S. Pat. App. Publication No. 2011/0143061 which disclose a two-part structural adhesive that includes (A) a resin containing at least one norbornane group and at least one methacrylate containing compound, and (B) a peroxide and at least one thiol;

U.S. Pat. App. Publication No. 2011/0126980 which is directed to a two-part structural adhesive including (A) an epoxy resin and, (B) an amine curing agent and a toughening agent and oil displacing agent in either component (A) or (B);

U.S. Pat. App. Publication No. 2011/0177242 which discloses a two-part structural adhesive composition containing (A) an aromatic epoxy resin and (B) an amine curing agent and at least one ester in either component (A) or (B); and U.S. Pat. No. 5,313,998 which relates to a two-part adhesive that includes (A) an acrylic and a peroxide and (B) a condensation reaction product of an aldehyde and amine and a copper salt and wherein an acid phosphate is added to either solution (A) or to both solutions (A) and (B).

In addition, U.S. Pat. No. 6,869,497 teaches a two part adhesive including (A) an acrylic monomer, a metal molybdate, and acrylic or methacrylic acid and (B) a peroxide while U.S. Pat. Nos. 7,348,385 and 7,479,528 teach two part adhesives containing (A) an acrylic monomer, chlorosulphonated polymer, and a peroxide and (B) a cycloheteroatom zirconate or titannate.

Known structural adhesives exhibit some shortcomings, for example, they exhibit yellowing when exposed to UV radiation, they contain hazardous peroxides, they exhibit slow cure at room temperature, and/or have less than desired sag resistance. Therefore, there is a need for a structural adhesive that is UV and sag resistant, can be tailored to a specific application, conveniently formulated, applied to one or more substrates and rapidly cured at room temperature to provide strong bonds over a desired time range.

SUMMARY OF THE INVENTION

The present disclosure relates to a multi-component UV resistant structural adhesive system that is substantially free of aromatic epoxy resins. In one embodiment, the multi-component adhesive system employs a part (A) containing a saturated epoxy resin and a (poly)glycerin polyglycidyl ether and a part (B) containing a metal salt catalyst and an amine hardener.

The multi-component structural adhesive system of the present disclosure may be used to bond a variety of substrates. Thus, in another embodiment, this disclosure provides a method for adhering a first surface to a second surface which includes: mixing a part (A) and a part (B) to form a curable composition, where the curable composition is substantially free of aromatic epoxy resins and where part (A) comprises a saturated epoxy resin and a (poly)glycerin polyglycidyl ether and part (B) comprises a metal salt catalyst and an amine hardener; applying the curable composition to at least the first surface, pressing the second surface and the first surface together so that the curable composition is between the two surfaces for a time sufficient to effect curing of the curable composition. Advantageously, the curing occurs at ambient temperature.

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

As used herein, the term "substantially free" means, when used with reference to the substantial absence of a material in an adhesive system or curable composition, that such a material is present, if at all, as an incidental impurity or by-product. In other words, the material does not affect the properties of the adhesive system or curable composition.

The present disclosure provides novel multi-component structural adhesive systems and articles or substrates adhered to one another with such systems. According to one embodiment, the multi-component structural adhesive system is a two-part structural adhesive system that is substantially free of aromatic epoxy resins, and includes a part (A) containing a saturated epoxy resin and a compound having at least two epoxy groups and one hydroxy group, and a part (B) containing a metal salt catalyst and at least one amine hardener. It has been surprisingly discovered that the two-part structural adhesive systems of the present disclosure, when cured at ambient temperature, exhibit excellent cure speed, are UV resistant and sag resistant and also demonstrate superior shear performance as compared to aromatic epoxy resin-containing adhesive systems. The two-part structural adhesive systems of the present disclosure are especially suitable for use in both outdoor and indoor adhesive applications where they may experience various amounts of exposure to UV radiation including the sun and simulated or actual indoor illumination conditions such as high-intensity bulbs, indoor lighting and the like since the cured two-part structural adhesives systems do not yellow.

In an embodiment, part (A) of the two-part structural adhesive system includes a saturated epoxy resin. The saturated epoxy resin may be any compound derived from a polyhydric phenol and having at least one vicinal epoxy group wherein the carbon-to-carbon bonds within the six-membered ring are saturated. Such saturated epoxy resins may be obtained by at least two known methods: (i) the hydrogenation of glycidyl polyethers of polyhydric phenols: or (ii) by the reaction of hydrogenated polyhydric phenols with epichlorohydrin in the presence of a reaction catalyst such as a Lewis acid (i.e. boron trihalide and complexes thereof) and subsequent dehydrochlorination in an alkaline medium. The method of preparation forms no part of the present disclosure and the resulting saturated epoxy resin derived by either method is suitable in the present structural adhesives.

Briefly, the first method includes the hydrogenation of glycidyl polyethers of polyhydric phenols with hydrogen in the presence of a rhodium and/or ruthenium catalyst supported on an inert carrier at a temperature below about 50° C. This method is thoroughly disclosed and described in U.S. Pat. No. 3,336,241 and is herein incorporated by reference. In addition, the saturated epoxy resins prepared by the method disclosed in U.S. Pat. No. 3,336,241 are suitable for use in the present structural adhesives and accordingly are herein incorporated by reference.

The second method includes the condensation of a hydrogenated polyphenol with epichlorohydrin hi the presence of a $BF_3$ catalyst, followed by dehydrochlorination in the presence of caustic. When the phenol is hydrogenated Bisphenol A, the resulting saturated epoxy resin is sometimes referred to as "diepoxidized hydrogenated Bisphenol A" or as the diglycidyl ether of 2,2-bis(4-cyclohexanol)propane.

In any event, the term "saturated epoxy resin" as used herein shall refer to the glycidyl ethers of polyhydric phenols wherein the aromatic ring structure of the phenols has been or is saturated.

Thus, in one embodiment, the saturated epoxy resin is a hydrogenated resin prepared by the process described in U.S. Pat. No. 3,336,241. In another embodiment, the saturated epoxy resin is a hydrogenated glycidyl ether of 2,2-bis(4-hydroxyphenyl)propane (i.e. Bisphenol A). In still another embodiment, the epoxy resin is a hydrogenated glycidyl ether of 2,2-bis(4-hydroxyphenyl)methane (i.e. Bisphenol F) or a hydrogenated glycidyl ether of 2,2-bis(4-hydroxyphenyl)sulfone (i.e. Bisphenol S).

In further embodiments, the amount of the saturated epoxy resin present in part (A) may range from about 50% by weight to about 90% by weight, and preferably ranges from about 60% to about 85% by weight, based on the total weight of part (A)

Part (A) further contains a compound having at least two epoxy groups and one hydroxy group. In one embodiment, the compound having at least two epoxy groups and one hydroxy group is a (poly)glycerin polyglycidyl ether. The (poly)glycerin polyglycidyl ether typically has the general formula (1):

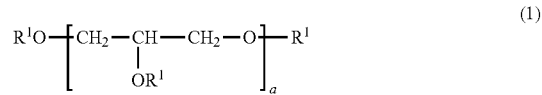

wherein $R^1$ is hydrogen or glycidyl, and a is an integer from 1 to 100, with the proviso that (a) one $R^1$ is hydrogen and two $R^1$'s are glycidyl when a is 1, and (b) at least one $R^1$ is hydrogen and at least two $R^1$'s are glycidyl when a is an integer from 2 to 100. According to one embodiment, a is an integer from 1 to 40. In another embodiment, a is an integer from 1 to 30. In a further embodiment, a is at least 2. In still another embodiment a is at least 3, and in yet another embodiment a is preferably at least 4. In addition, the (poly)glycerin polyglycidyl ether of formula (1) may have a ratio of glycidyl groups (E) to hydroxy groups (F) on a molar basis in the range $0.01 \leq E/F \leq 100$, more preferably in the range $0.02 \leq E/F \leq 50$, and even more preferably in the range $0.1 \leq E/F \leq 40$. According to other embodiments, the (poly) glycerin polyglycidyl ether has an epoxy equivalent of 100 to 500, more preferably 100 to 400 and even more preferably 100 to 300.

In another embodiment, the compound having at least two epoxy groups and at least one hydroxyl group is a sorbitol polyglycidyl ether. The sorbitol polyglycidyl ether may have the general formula (2)

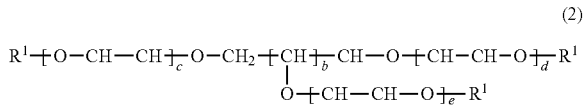

wherein $R^1$ is hydrogen or glycidyl, with the proviso at least one $R^1$ being hydrogen and at least two $R^1$'s being glycidyl, b is an integer from 4 to 10, c is an integer from 0 to 10, d is an integer from 0 to 10 and e is an integer from 0 to 10. According to another embodiment, b, c, d, and e are integers from: $4 \leq b \leq 8$, $0 \leq c \leq 8$, $0 \leq d \leq 8$ and $0 \leq e \leq 8$; and preferably, $4 \leq b \leq 5$, $0 \leq c \leq 5$, $0 \leq d \leq 5$ and $0 \leq e \leq 5$. In addition, in another embodiment, the sorbitol polyglycidyl ether of formula (2) has a ratio of glycidyl groups (G) to hydroxyl groups (H) on a molar basis in the range $0.1 \leq G/H \leq 9$, more preferably in the range $0.2 \leq G/H \leq 5$. According to other embodiments, the sorbitol polyglycidyl ether has an epoxy equivalent of 100 to 500, more preferably 100 to 400 and even more preferably 100 to 300.

In further embodiments, the amount of the compound having at least two epoxy groups and one hydroxy group in part (A) may range from about 10% by weight to about 50% by weight, and preferably ranges from about 15% to about 40% by weight, based on the total weight of part (A).

As mentioned above, part (B) of the two-part structural adhesive system contains a metal salt catalyst. According to one embodiment, the metal salt catalyst is a group I metal, group II metal or lanthanoid salt wherein the anion is selected from a nitrate, iodide, thioisocyanate, triflate, alkoxide, perchlorate, and sulfonate. In one preferred embodiment, the anion is selected from a nitrate, iodide, thioisocyanate and sulfonate.

According to one embodiment, the preferred group I metal (cation) is lithium, the preferred group II metal is calcium or magnesium with calcium being especially preferred.

Accordingly, in one embodiment, the metal salt catalyst is selected from lanthane nitrate, lanthane triflate, lithium iodide, lithium nitrate, calcium nitrate and their corresponding hydrates. Excellent results may be obtained when the metal salt catalyst is calcium nitrate or a hydrate thereof.

In general, a catalytic amount of metal salt catalyst is employed. In one embodiment, the catalytic amount of metal salt catalyst employed in part (B) may range from about 0.1% by weight to about 20% by weight, preferably from about 0.5% by weight to about 15% by weight, based on the total weight of part (B).

In another embodiment, the metal salt catalyst may be dissolved in a solvent. The solvent is preferably a polyalkylene glycol or polyalkylene ether glycol having an average molecular weight between about 200 and about 1500. In one embodiment, the solvent is polyethylene glycol or polypropylene glycol having an average molecular weight between about 400 and 1000.

The amount of solvent used will vary somewhat depending upon the particular saturated epoxy resin, amine hardener and/or metal salt catalyst employed; however, the amount may generally range on a weight ratio of solvent to metal salt catalyst of from about 1:3 to about 6:3.

Part (B) further includes an amine hardener. According to one embodiment, the amine hardener is a polyoxyalkylene polyamine, an aliphatic amine or a cycloaliphatic amine. Mixtures of these amine hardeners may also be included in part (B). Thus, in one embodiment, the amine hardener is selected from a polyoxyalkylene polyamine, an aliphatic amine, a cycloaliphatic amine and a mixture thereof.

In one embodiment, the amine hardener is a polyoxyalkylene polyamine. The polyoxyalkylene polyamine includes polyoxypropylene diamines, polyoxypropylene triamines and polyoxyethylene/oxypropylene diamines containing both ethylene oxide and propylene oxide.

One group of polyoxypropylene diamines that may be used are those sold under the JEFFAMINE® D-series brand amines by Huntsman Petrochemical Corporation having the formula (3)

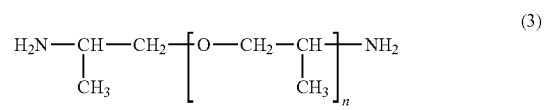

wherein n is a number having an average value of about 1 to about 50.

Representative products include a polyoxypropylene diamine having an average molecular weight of about 230 wherein the value of n is about 2.5 (JEFFAMINE® D-230 amine), a polyoxypropylene diamine having an average molecular weight of about 400 wherein the value of n is about 5.6 (JEFFAMINE® D-400 amine), a polyoxypropylene diamine having an average molecular weight of about 2000 wherein n has a value of about 33 (JEFFAMINE® D-2000).

One group of polyoxypropylene triamines that may be used are those sold under JEFFAMINE® T-series brand amines by Huntsman Petrochemical Corporation having the formula (4):

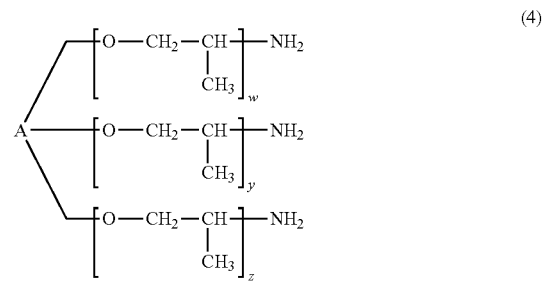

wherein A represents a trivalent hydrocarbon group consisting of 3 to 6 carbon atoms, resulting from the propoxylation susceptible aliphatic trihydric alcohol containing 3 to 6 carbon atoms, w, y, and z are integers and the average value of w+y+z is from about 4 to about 100.

Representative products include a polyoxypropylene triamine having an average molecular weight of about 400 wherein A represents a trimethylol propane nucleus and the product contains an average of about 5.3 oxypropylene groups (JEFFAMINE® T-403 amine), a polyoxypropylene triamine having an average molecular weight of about 3000 wherein A represents a trimethylol propane nucleus and the product contains about 50 oxypropylene groups (JEFFAMINE® T-3000 amine) and a polyoxypropylene triamine having an average molecular weight of about 5000 wherein A represents a glycerol nucleus and the product contains about 86 oxypropylene groups (JEFFAMINE® T-5000 amine).

One group of polyoxypropylene diamines containing both ethylene oxide and propylene oxide that may be used are those sold under JEFFAMINE® ED-series brand amines by Huntsman Petrochemical Corporation having the formula (5)

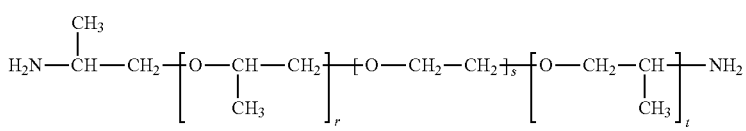

(5)

wherein r+t equals an integer having a value of from about 2 to about 10 and s is an integer having a value of from about 1 to about 90.

Representative products include a polyoxyalkylene diamine containing both ethylene oxide and propylene oxide having an average molecular weight of about 600 wherein s is about 8.5 and r+t is about 2.5 (JEFFAMINE® ED-600 amine), a polyoxyalkylene diamine containing both ethylene oxide and propylene oxide having an average molecular weight of about 900 wherein s is about 15.5 and r+t is about 2.5 (JEFFAMINE® ED-900 amine) and a polyoxyalkylene diamine containing both ethylene oxide and propylene oxide having an average molecular weight of about 4000 wherein s is about 85 and r+t is about 2.5 (JEFFAMINE® ED-4000 amine).

In another embodiment the amine hardener is an aliphatic or cycloaliphatic amine. The aliphatic or cycloaliphatic amine may be those which contain more than 2 active hydrogen atoms per molecule such as diethylenetriamine, triethylene diamine, triethylenetetramine, tetraethylene-pentamine, 2,2,4- and/or 2,4,4-trimethylhexamethylenediamine, 1,6-hexanediamine, 1-ethyl-1,3-propanediamine, 2,2(4),4-trimethyl-1,6-hexanediamine, bis(3-aminopropyl)piperazine, N-aminoethylpiperazine, bis(3-aminopropyl)ethylenediamine, 1,2-diaminocyclohexane, 1,4-diamino-2,5-diethylcyclohexane, 1,2-diamino-4-ethylcyclohexane, 1,4-diamino-2,5-diethylcyclo-hexane, 1,2-diamino-4-cyclohexylcyclohexane, isophorone diamine, norbornanediamine, 4,4'-diaminodicyclohexylmethane, 4,4'-diaminodicyclohexylethane, 4,4'-diaminodicyclohexylpropane, 2,2-bis(4-aminocyclohexyl)propane, 3,3'-dimethyl-4,4'-diaminodicyclohexylmethane, 3-amino-1-(4-aminocyclohexyl)propane, 1,3- and 1,4-bis(aminomethyl)cyclohexane.

The amount of amine hardener present in part (B) will vary somewhat, but will be a curing amount. In one embodiment, the amount of amine hardener in part (B) is the amount required to furnish one amino hydrogen per epoxy group (stoichiometric amount) in part (A) although some embodiments may use up to about 100% excess of amine hardener. In other embodiments, the amount of amine hardener present in part (B) may range from about 20% by weight to about 70% by weight, and preferably ranges from about 35% to about 55% by weight, based on the total weight of part (B)

According to some embodiments, part (A) and/or part (B) further contains a filler. Examples of fillers include, but are not limited to, glass fiber, asbestos, alumina fiber, ceramic fiber consisting of alumina and silica, boron fiber, zirconia fiber, silicon carbide fiber, metal fiber, or a similar fibrous filler; amorphous silica, crystalline silica, precipitated silica, fumed silica, baked silica, zinc oxide, baked clay, carbon black, glass beads, alumina, talc, calcium carbonate, clay, aluminum hydroxide, magnesium hydroxide, barium sulfate, titanium dioxide, aluminum nitride, boron nitride, silicon carbonate, aluminum oxide, magnesium oxide, titanium oxide, beryllium oxide, kaolin, mica, zirconia, or a similar powdered filler. The aforementioned fillers may be used in a combination of two or more. In one embodiment, when present in part (A), the amount of filler used may be from about 0.5% by weight to about 20% by weight, preferably from about 1% by weight to about 10% by weight, based on the total weight of part (A). In another embodiment, when present in part (B), the amount of filler used may be from about 0.5% by weight to about 50% by weight, preferably from about 1% by weight to about 40% by weight, based on the total weight of part (B).

Other known additives which may be included in part (A) and/or (B) include: plasticizers, diluents, stabilizers, emulsifiers, toughening agents, oil-displacing agents, reinforcers, a foaming agent, an antioxidant, inhibitors, and a lubricant.

As noted above, the two-part structural adhesive systems according to the present disclosure may contain a part (A) and, separate therefrom, a part (B). Part (A) comprises the saturated epoxy resin and the compound having at least two epoxy groups and one hydroxy group and part (B) comprises a metal salt catalyst and an amine hardener. In one embodiment, when fillers are present, they may be added to part (B). As for any remaining optional additives that may be added to the system, additives that react with epoxy groups are preferably added to part (B) and additives that react with amine hydrogens are preferably added to part (A) and additives that do not react with either epoxy groups or amine hydrogens may be added to part (A), part (B) or a combination thereof. Alternatively, a separate part (C) for one or more of these additives may be employed Thus, in particular embodiments, there is provided a two part structural adhesive system comprising a part (A) and separate and apart therefrom a part (B) wherein part (A) and part (B) may have the following components based on percent by weight:

| Components | Example (i) | Example (ii) |
|---|---|---|
| Part (A) | | |
| Saturated Epoxy Resin | 42.0 | 46.9 |
| (Poly)glycerin Polyglycidyl Ether | 18.0 | 20.1 |
| Part (B) | | |
| Metal Salt Catalyst | 0.3 | 5.0 |
| Amine Hardener | 6.9 | 21.7 |
| Filler | 8.0 | 21.0 |

According to one embodiment, the structural adhesive systems of the present disclosure may be prepared by first combining the respective ingredients in part (A) and part (B). Part (A) and part (B) can then be contacted or mixed using any conventional device just prior to use to form a curable composition.

In another embodiment, the present disclosure provides a method of bonding at least two substrates together which includes:
(a) providing a part (A) containing a saturated epoxy resin and a compound having at least two epoxy groups and one hydroxy group;
(b) providing a part (B) containing a metal salt catalyst and an amine hardener;

(c) contacting parts (A) and (B) to form a curable composition;
(d) applying the curable composition to at least one surface of one or more of the substrates; and
(e) matingly engaging the surfaces of the substrates which are to be bonded together permitting the composition to cure to form a bond there between.

Curing is preferably done at ambient temperature. The amounts of part (A) and part (B) will depend on the desired epoxy to amine hydrogen molar ratio. Thus, in one embodiment, the structural adhesives may have a molar ratio of epoxy moieties to amine hydrogens ranging from about 0.5:1 to about 3:1. In other embodiments, the molar ratio of epoxy moieties to amine hydrogens is about 2:1. In other embodiments, the molar ratio of epoxy moieties to amine hydrogens is about 1:1. The respective amount of part (A) and part (B) are generally mixed together immediately prior to use.

In one embodiment, parts (A) and (B), after mixing, are applied to a surface of at least one substrate by brushing, rolling, spraying, dotting, or kniving. The surface may be untreated, oily, etc. The substrates to be adhered may be clamped for firmness during cure in those installations where relative movement of the substrates might be expected. For example, to adhere two substrate surfaces, an adherent quantity of the curable composition is applied to at least one surface, preferably to both surfaces, and the surfaces are contacted with the curable composition therebetween. The smoothness of the surfaces and their clearance will determine the required film thickness for optimum bonding. The surfaces and the interposed curable composition are then maintained in engagement until the curable composition has cured sufficiently to bond the surfaces. Examples of substrates which the curable composition may be applied to include, but are not limited to, steel, galvanized steel, aluminum, copper, brass, wood, glass, paper, composites, granite, marble, concrete, stone, brick, ceramic, corian, plastics and polymeric materials such as polyester, polyamide, polyurethane, polyvinyl chloride, polycarbonates, ABS plastics, and plexiglass. The adhered substrates may be used in either indoor or outdoor applications.

The two-part structural adhesive systems of the present disclosure are both ambient temperature curable and/or heat curable. In some embodiments, the two-part structural adhesive systems may be cured at ambient temperature for at least two hours. This includes embodiments where the two-part structural adhesives are cured at ambient temperature for at least 24 hours. In other embodiments, the two-part structural adhesive systems may be cured at ambient temperature followed by a post cure at about 70° C.

The two-part structural adhesive systems, upon curing, provide very strong bond strengths which may range from about 2500-4000 psi in shear. In addition, when cured at ambient temperature, the two part structural adhesive systems may exhibit a working time of about 2-6 hours, preferably of about 2-4 hours. Finally, the two-part structural adhesive systems of the present disclosure, after curing, remain non-yellow when exposed to UV radiation. The degree of yellowing may be evaluated using the standard method according to ASTM E313-00 "Standard Practice For Calculating Yellowness And Whiteness Indices From Instrumentally Measured Color Coordinates." ASTM procedures and guidelines may be obtained from the American Society For Testing And Materials and the entire contents of ASTM E313-00 are incorporated herein by reference.

EXAMPLES

Examples 1-2

The following components were combined to form parts (A) and (B) of a two-part structural adhesive system:

| Component | Ex 1. (grams) | Ex. 2 (grams) |
|---|---|---|
| Part (A) | | |
| Epalloy 5001 (mixture of epoxidized hydrogenated bisphenol A and sorbitol polyglycidyl ether) | 100 | 100 |
| Part (B) | | |
| JEFFCAT ® TD 33A amine (triethylene diamine) | 2.0 | 2.0 |
| ARADUR ® 42 amine (isophorone diamine) | 49.0 | 44.0 |
| JEFFAMINE ® D-230 amine | 49.0 | 44.0 |
| Ca(NO$_3$)$_2$ dissolved in polyethylene glycol | | 10.0 |

Parts (A) and (B) were then mixed at a 4:1 ratio by weight to form a curable composition which exhibited the following properties upon curing:

| Physical Property | Ex. 1 | Ex. 2 |
|---|---|---|
| Working time (10 g total mass) | 6-8 hours | 2-3 hours |
| Lap shear strength at 77° F. on Al substrate 1 day cured at ambient temperature | Ave. = 1154 psi Range = 1118-1226 psi | Ave = 2055 psi Range = 1993-2152 psi |
| Lap shear strength at 77° F. on steel substrate 1 day cured at ambient temperature | Ave = 1725 psi Range = 1707-1774 psi | Not tested |
| Lap shear strength at 77° F. on corian substrate 1 day cured at ambient temperature | All substrates failed | Not tested |

From the results, it is shown that the addition of a metal salt catalyst significantly improves the working time and shear strength of the structural adhesive.

Examples 3-4

The following components were combined to form parts (A) and (B) of a two-part structural adhesive system according to the present disclosure:

| Component | Ex. 3 (grams) | Ex. 4 (grams) |
|---|---|---|
| Part (A) | | |
| Epalloy 5001 | 94.0 | 94.0 |
| Cabosil TS 720 (Fumed Silica) | 6.0 | 6.0 |
| Part (B) | | |
| JEFFCAT ® 33A amine | 2.0 | 2.0 |
| ARADUR ® 42 amine | 25.0 | 25.0 |
| JEFFAMINE ® D230 amine | 25.0 | 25.0 |
| Ca(NO$_3$)$_2$ dissolved in polyethylene glycol | 10.0 | 10.0 |

| Component | Ex. 3 (grams) | Ex. 4 (grams) |
|---|---|---|
| Titanium dioxide | 1.0 | 1.0 |
| Cabosil TS 720 | 6.0 | 10.0 |
| Calwhite (calcium carbonate) | 31.0 | 27.0 |

Parts (A) and (B) were then mixed at a 2:1 ratio by volume to form a curable composition which exhibited the following properties:

| Phys. Property | Ex. 3 | Ex. 4 |
|---|---|---|
| Working time (minutes) | 3-4 hours | 2-3 hours |
| Lap shear strength at 77° F., on Al substrate, 1 day cured at ambient temperature | Ave = 2628 psi Range = 2556-2683 psi | Ave = 3344 psi Range = 2971-3784 psi |

Example 5

The following components were combined to form parts (A) and (B) of a two-part structural adhesive system according to the present disclosure:

| Component | Ex. 5 (grams) |
|---|---|
| Part (A) | |
| Epalloy 5001 | 94.0 |
| Cabosil TS 720 | 6.0 |
| Part (B) | |
| JEFFCAT ® 33A amine | 2.0 |
| ARADUR ® 42 amine | 25.0 |
| JEFFAMINE ® D230 amine | 25.0 |
| Ca(NO$_3$)$_2$ dissolved in polyethylene glycol | 10.0 |
| Titanium dioxide | 1.0 |
| Cabosil TS 720 | 10.0 |
| Calwhite (calcium carbonate) | 27.0 |

The density of parts (A) and (B) was measured and determined to be 1.16 g/cc and 1.30 g/cc respectively. In addition, it was observed that part (A) was a clear paste while part (B) was a white paste.

Parts (A) and (B) were then mixed at a 2:1 ratio by volume to form a white paste curable composition which exhibited the following properties upon curing at ambient temperature:

| Physical Property | Ex. 5 |
|---|---|
| Working time | 2-3 hours |
| Hardness Shore D | 85 |
| DMA | |
| Storage Modulus | 36° C. |
| Loss Modulus | 47° C. |
| Tan Delta | 58° C. |
| Lap shear strength at 77° F. on Al substrate 1 day cured at ambient temperature | Ave. = 3344 psi |
| Lap shear strength at 77° F. on Al substrate 3 days cured at ambient temperature | Ave. = 3450 psi |
| Lap shear strength at 77° F. on corian substrate 1 day cured at ambient temperature | Substrate failure |
| Tensile Shear Strength (Butt Joint) at 77° F. on corian substrate 1 day cured at ambient temperature | Ave. = 2652 psi |
| Handling strength at 77° F. on Al substrate | 7 hours |
| Handling strength at 122° F. on Al substrate | 30 minutes |
| Handling strength at 158° F. on Al substrate | 5 minutes |
| Sag resistance | Yes |
| UV resistance on corian substrate, 7 day in QUV chamber (8 hrs UV + 4 hours condensation at 50° C. cycle) per ASTM E313 | Delta E$_{94}$ = 2.03 |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A two-part structural adhesive system comprising:
a part (A) containing from about 50% to about 90% by weight, based on the total weight of part (A), of a saturated epoxy resin and from about 10% to about 50% by weight, based on the total weight of part (A), of a compound having at least two epoxy groups and at least one hydroxy group, wherein the compound is selected from a (poly)glycerin polyglycidyl ether having the formula (1) or a sorbitol polyglycidyl ether having the formula (2):

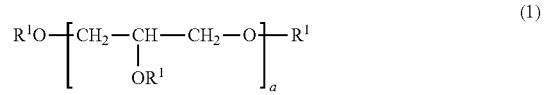

(1)

wherein a is an integer from 2 to 100, and $R^1$ is hydrogen or glycidyl, with the proviso that at least one $R^1$ is hydrogen and at least two $R^1$'s are glycidyl;

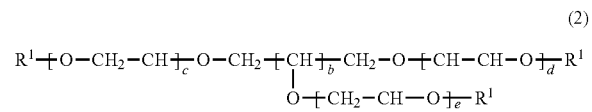

(2)

wherein b is an integer from 4 to 10, c is an integer from 0 to 10, d is an integer from 0 to 10, e is an integer from 0 to 10, and $R^1$ is hydrogen or glycidyl, with the proviso at least one $R^1$ being hydrogen and at least two $R^1$'s being glycidyl, a part (B) containing a metal salt catalyst and an amine hardener wherein the adhesive system is substantially free of aromatic epoxy resins, wherein part (A) and part (B) are spatially separated from each other to inhibit parts (A) and (B) from reacting before part (A) and part (B) are mixed.

2. The two-part structural adhesive system of claim 1, wherein the saturated epoxy resin is a hydrogenated glycidyl ether of 2,2-bis(4-hydroxyphenyl)propane.

3. The two-part structural adhesive of claim 1, wherein b, c, d, and e are integers from: $4 \leq b \leq 8$, $0 \leq c \leq 8$, $0 \leq d \leq 8$ and $0 \leq e \leq 8$.

4. The two-part structural adhesive of claim 1, wherein the sorbitol polyglycidyl ether of formula (2) has a ratio of glycidyl groups (G) to hydroxyl groups (H) on a molar basis in the range $0.1 \leq G/H \leq 9$.

5. The two-part structural adhesive of claim 1, wherein the sorbitol polyglycidyl ether has an epoxy equivalent of 100 to 500.

6. The two-part structural adhesive of claim 1, wherein the metal salt catalyst is calcium nitrate or a hydrate thereof.

7. The two-part structural adhesive system of claim 1, wherein the amine hardener is selected from a polyoxyalkylene polyamine, an aliphatic amine, a cycloaliphatic amine and a mixture thereof.

8. The two-part structural adhesive system of claim 1, wherein part (A), part (B), or both parts (A) and (B) further comprises a filler.

9. The two-part structural adhesive system of claim 1, wherein the compound having at least two epoxy groups and at least one hydroxy group is the sorbitol polyglycidyl ether having the formula (2):

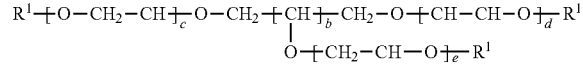

(2)

wherein b is an integer from 4 to 10, c is an integer from 0 to 10, d is an integer from 0 to 10, e is an integer from 0 to 10, and $R^1$ is hydrogen or glycidyl, with the proviso that (a) when b is 4, at least one $R^1$ is hydrogen and two, three, or five $R^1$'s are glycidyl, and (b) when b is an integer from 5 to 10, at least one $R^1$ is hydrogen and at least two $R^1$'s are glycidyl.

10. A method of preparing a two-part structural adhesive system substantially free of aromatic epoxy resins comprising:

(a) providing a part (A) comprising from about 50% to about 90% by weight, based on the total weight of part (A), of a saturated epoxy resin and from about 10% to about 50% by weight, based on the total weight of part (A), of a compound having at least two epoxy groups and at least one hydroxy group, wherein the compound is selected from a (poly)glycerin polyglycidyl ether having the formula (1) or a sorbitol polyglycidyl ether having the formula (2):

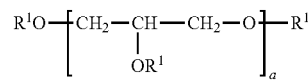

(1)

wherein a is an integer from 2 to 100, and $R^1$ is hydrogen or glycidyl, with the proviso that at least one $R^1$ is hydrogen and at least two $R^1$'s are glycidyl;

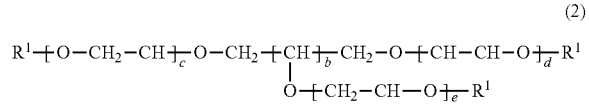

(2)

wherein b is an integer from 4 to 10, c is an integer from 0 to 10, d is an integer from 0 to 10, e is an integer from 0 to 10, and $R^1$ is hydrogen or glycidyl, with the proviso at least one $R^1$ being hydrogen and at least two $R^1$'s being glycidyl, (b) providing a part (B) comprising a metal salt catalyst and an amine hardener.

11. A two-part adhesive system produced according to the method of claim 10 wherein the two-part structural adhesive system, upon curing at ambient temperature, remains sag resistant and non-yellow when exposed to UV radiation.

12. The method of claim 10, wherein the compound having at least two epoxy groups and at least one hydroxy group is the sorbitol polyglycidyl ether having the formula (2):

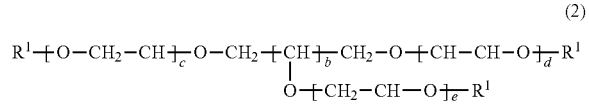

(2)

wherein b is an integer from 4 to 10, c is an integer from 0 to 10, d is an integer from 0 to 10, e is an integer from 0 to 10, and $R^1$ is hydrogen or glycidyl, with the proviso that (a) when b is 4, at least one $R^1$ is hydrogen and two, three, or five $R^1$'s are glycidyl, and (b) when b is an integer from 5 to 10, at least one $R^1$ is hydrogen and at least two $R^1$'s are glycidyl.

13. A method of bonding at least two substrates together comprising:

i. providing a part (A) containing from about 50% to about 90% by weight, based on the total weight of part (A), of a saturated epoxy resin and from about 10% to about 50% by weight, based on the total weight of part (A), of a compound having at least two epoxy groups and one hydroxyl group, wherein the compound is selected from a (poly)glycerin polyglycidyl ether having the formula (1) or a sorbitol polyglycidyl ether having the formula (2):

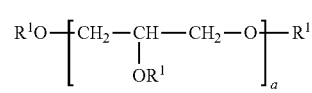

(1)

wherein a is an integer from 2 to 100, and $R^1$ is hydrogen or glycidyl, with the proviso that at least one $R^1$ is hydrogen and at least two $R^1$'s are glycidyl;

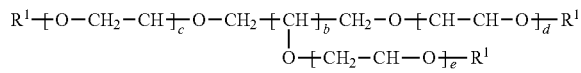
(2)

wherein b is an integer from 4 to 10, c is an integer from 0 to 10, d is an integer from 0 to 10, e is an integer from 0 to 10, and $R^1$ is hydrogen or glycidyl, with the proviso at least one $R^1$ being hydrogen and at least two $R^1$'s being glycidyl;

ii. providing a part (B) containing a metal salt catalyst and an amine hardener;

iii. contacting parts (A) and (B) to form a curable composition that is substantially free of aromatic epoxy resins;

iv. applying the curable composition to at least one surface of one or more of the substrates; and v. matingly engaging the surfaces of the substrates together permitting the composition to cure to form a bond therebetween.

14. The method of claim 13 wherein parts (A) and (B) are mixed at a molar ratio of epoxy moieties to amine hydrogens ranging from about 0.5:1 to about 3:1 by volume.

15. The method of claim 13, wherein at least one of the substrates is steel, galvanized steel, aluminum, copper, brass, wood, glass, paper, composites, granite, marble, ceramic, concrete, stone, brick, corian, plastic, polyester, polyamide, polyurethane, polyvinyl chloride, polycarbonates, ABS plastic or plexiglass.

16. The method of claim 13, wherein the substrates are used in outdoor applications.

17. The method of claim 13, wherein the substrates are used in indoor applications.

\* \* \* \* \*